(12) United States Patent
Downie

(10) Patent No.: US 9,149,740 B2
(45) Date of Patent: Oct. 6, 2015

(54) WATER AND DIRT SEPARATOR

(75) Inventor: Simon Downie, Gloucestershire (GB)

(73) Assignee: ADEY HOLDINGS (2008) LIMITED, Gloucestershire (GB)

( * ) Notice: Subject to any disclaimer, the term of this patent is extended or adjusted under 35 U.S.C. 154(b) by 344 days.

(21) Appl. No.: 13/990,818

(22) PCT Filed: Dec. 1, 2011

(86) PCT No.: PCT/GB2011/052372
§ 371 (c)(1),
(2), (4) Date: May 31, 2013

(87) PCT Pub. No.: WO2012/073029
PCT Pub. Date: Jun. 7, 2012

(65) Prior Publication Data
US 2013/0248433 A1    Sep. 26, 2013

(30) Foreign Application Priority Data
Dec. 1, 2010 (GB) .................................. 1020349.5

(51) Int. Cl.
*B01D 21/00* (2006.01)
*B01D 21/24* (2006.01)
(Continued)

(52) U.S. Cl.
CPC .......... *B01D 21/003* (2013.01); *B01D 21/0009* (2013.01); *B01D 21/0036* (2013.01); *B01D 21/2483* (2013.01); *B03C 1/28* (2013.01); *B03C 1/286* (2013.01); *B03C 1/288* (2013.01); *F24D 19/0092* (2013.01); *B01D 2221/02* (2013.01); *B03C 2201/18* (2013.01); *B03C 2201/28* (2013.01)

(58) Field of Classification Search
CPC .............. F24D 19/0092; B01D 21/003; B01D 21/0009; B01D 21/0036; B01D 21/2483; B01D 2221/02; B03C 1/28; B03C 1/286; B03C 1/288; B03C 2201/18; B03C 2201/28
See application file for complete search history.

(56) References Cited

U.S. PATENT DOCUMENTS

| 1,175,948 | A | 3/1916 | French |
| 1,679,898 | A | 8/1928 | Gilbert |
| 1,932,322 | A | 10/1933 | Nordstrom |

(Continued)

FOREIGN PATENT DOCUMENTS

| CN | 2176836 | 9/1994 |
| CN | 101028708 | 9/2007 |

(Continued)

OTHER PUBLICATIONS

The Chapter II International Preliminary Report on Patentability PCT 409 for PCT/GB2011/052372, dated Jan. 24, 2013.*

*Primary Examiner* — David A Reifsnyder
(74) *Attorney, Agent, or Firm* — Fraser Clemens Martin & Miller LLC; Jacob M. Ward

(57) ABSTRACT

A separator (10) comprises a housing (12) and a separator chamber (14) contained within the housing (12), an inlet (16) and outlet (18) to the separator chamber and a dividing member (20) for substantially dividing the separator chamber (14) into a first chamber (22) and a second chamber (24). A flow path is provided between the first and second chambers (22), (24) for allowing flow to circulate between the first and second chambers, and obstruction means (74) is provided in the second chamber (24) for slowing flow through the second chamber (24).

20 Claims, 6 Drawing Sheets

(51) Int. Cl.
   *B03C 1/28*     (2006.01)
   *F24D 19/00*    (2006.01)

(56)           References Cited

U.S. PATENT DOCUMENTS

| | | | |
|---|---|---|---|
| 2,029,202 | A | 1/1936 | Shepherd |
| 2,046,228 | A | 6/1936 | Wiedmann |
| 2,277,646 | A | 3/1942 | Johnson |
| 3,339,740 | A | 9/1967 | Boris |
| 3,356,391 | A | 12/1967 | Bailey |
| 3,384,408 | A | 5/1968 | Furzey |
| 3,412,854 | A | 11/1968 | Klein |
| 3,696,927 | A | 10/1972 | Jakobsson |
| 3,794,041 | A | 2/1974 | Frei |
| 4,181,340 | A | 1/1980 | Kofford |
| 4,479,511 | A | 10/1984 | Holland |
| 4,524,800 | A | 6/1985 | Holland |
| 4,544,483 | A | 10/1985 | Arvai |
| 4,554,940 | A | 11/1985 | Loup |
| 4,562,852 | A | 1/1986 | Britt |
| 4,585,553 | A | 4/1986 | Hikosaka |
| 4,834,140 | A | 5/1989 | Schmidt |
| 5,085,768 | A | 2/1992 | Murakami et al. |
| 5,204,048 | A | 4/1993 | Rider |
| 5,257,525 | A | 11/1993 | Clarke |
| 5,289,842 | A | 3/1994 | Bravo |
| 5,549,827 | A | 8/1996 | Batson |
| 5,562,188 | A | 10/1996 | Appelgren |
| 5,891,331 | A | 4/1999 | Yang |
| 5,944,973 | A | 8/1999 | Hall |
| 6,357,465 | B1 | 3/2002 | Caldwell |
| 6,458,274 | B1 | 10/2002 | Mori |
| 6,488,848 | B1 | 12/2002 | Smith |
| 6,708,717 | B1 | 3/2004 | Coogle |
| 2002/0070547 | A1 | 6/2002 | Guertin |
| 2002/0088756 | A1 | 7/2002 | Wolosion |
| 2002/0096464 | A1 | 7/2002 | Simonson |
| 2004/0069699 | A1 | 4/2004 | Caiozza |
| 2006/0283783 | A1 | 12/2006 | Adey |
| 2008/0083668 | A1 | 4/2008 | Caiozza |
| 2009/0266768 | A1 | 10/2009 | Garrison |
| 2010/0200471 | A1 | 8/2010 | Adey |

FOREIGN PATENT DOCUMENTS

| | | |
|---|---|---|
| DE | 2655623 | 6/1977 |
| DE | 3515169 | 11/1985 |
| DE | 4404661 | 8/1995 |
| DE | 19717869 | 12/1997 |
| DE | 29813887 | 7/1999 |
| DE | 10310420 | 7/2004 |
| DE | 102004029197 | 1/2006 |
| DE | 102007049206 | 4/2009 |
| EP | 0025628 | 3/1981 |
| EP | 0026530 | 4/1981 |
| EP | 0202071 | 11/1986 |
| EP | 0779245 | 6/1997 |
| EP | 0873774 | 10/1998 |
| EP | 0890552 | 1/1999 |
| FR | 2778178 | 11/1999 |
| FR | 2878169 | 5/2006 |
| GB | 737822 | 10/1955 |
| GB | 855928 | 12/1960 |
| GB | 1530296 | 10/1978 |
| GB | 2072807 | 10/1981 |
| GB | 2233727 | 1/1991 |
| GB | 2391826 | 2/2004 |
| GB | 2402894 | 12/2004 |
| GB | 2450335 | 12/2008 |
| GB | 2458647 | 9/2009 |
| JP | 2006000821 | 1/2006 |
| KR | 1020090120192 | 11/2009 |
| WO | WO8402855 | 8/1984 |
| WO | WO9942198 | 8/1999 |
| WO | WO03062694 | 7/2003 |
| WO | WO2007031984 | 3/2007 |
| WO | WO2008101351 | 8/2008 |
| WO | WO2009052102 | 4/2009 |
| WO | WO2004105954 | 12/2009 |
| WO | WO2010037162 | 4/2010 |

\* cited by examiner

WATER AND DIRT SEPARATOR

The present invention relates to a separator suitable for separating particles from a fluid flow and particularly but not exclusively to a separator for separating particles from central heating system water.

BACKGROUND TO THE INVENTION

It is already known to use a magnetic separator to separate magnetic particles from central heating system water, as described in granted British Patent GB2402894. It is a well understood problem that, over time, oxygen contained within the system water of domestic and commercial heating systems causes corrosion to the inner surfaces of pipes, radiators, boiler heat exchangers and the like. The corrosion results in the system water carrying ferrous particles, sometimes referred to as magnetite. Other non-magnetic particles are also carried in the system water. The magnetic and non-magnetic particles, if left in the system water, tend to build up as sludge over time and reduce the efficiency of the system. They may build up in the boiler thus reducing heat transfer, in the lower corners of radiators causing cold spots, or in pipe work causing reduced flowrate of system water and increasing the demand on the system pump.

It is known to add inhibitors to try and prevent corrosion, but often the inhibitors only slow or delay the onset of corrosion problems rather than removing them. Whilst a magnetic separator is effective in removing magnetite, it is only partially successful in removing non-magnetic particles. An advantage of, for example, the magnetic separator of GB 2402894 is that the flow of system water through the separator is hardly restricted at all and the losses in the separator are minimal. Swirl is set up in the separator around a sleeved magnet and magnetite in the system water is attracted out of the flow by magnetic attraction.

However, in order to effectively remove non-magnetic particles held in suspension, it is necessary to significantly slow the flow rate of the system water. However, it is undesirable to slow the flow rate, because this has a detrimental effect on the heating efficiency of the system. Furthermore, it is not desirable to pass the system water through a filter, such as a mesh or gauze, because this significantly impedes the flow, reduces efficiency, can clog easily and requires relatively frequent cleaning.

It is an object of the invention to provide a separator suitable for separating particles from water circulating in a closed system which substantially mitigates or reduces these problems.

STATEMENT OF INVENTION

According to the present invention, there is provided a separator comprising a housing and a separator chamber contained within the housing, an inlet and outlet to the separator chamber, a dividing member for substantially dividing the separator chamber into a first chamber and a second chamber, a flow path provided between the first and second chambers for allowing flow to circulate between the first and second chambers, and obstruction means provided in the second chamber for slowing flow through the second chamber.

Advantageously, flow in the first chamber of the separator is substantially unrestricted, but a portion of the flow passes into the second chamber, where it is slowed by the obstruction means to a sufficient degree to allow particles carried in the system water to drop out of suspension and be collected in the second chamber.

The housing may include a body portion and a removable closure portion, which may be screw threaded to the body portion to allow access to the separator chamber for servicing and cleaning.

The second chamber may include a tray having a base and at least one sidewall for collecting sediment. The tray may be removable for cleaning.

The dividing member may adjoin and be releasably connected to the tray, for example, by means of a bayonet fixing.

The ability to detach the dividing member from the top of the tray allows access to the tray for cleaning.

A magnet may be provided in the first chamber and a tubular sleeve may be provided around the magnet. Magnetic particles, eg magnetite is drawn towards the magnet and is held against the outer wall of the tubular sleeve. On removal of the magnet from within the sleeve, the magnetite falls away for disposal.

The tubular sleeve may be mounted to the dividing member and may extend longitudinally along a central axis of the first chamber.

A substantially conical deflector may be mounted at the upper end of the first chamber for accelerating flow in the upper part of the chamber. This acceleration of flow substantially prevents cavitation at the outlet.

The conical deflector may be mounted to the tubular sleeve. The tray, dividing member, tubular sleeve and substantially conical deflector may be removable for cleaning.

A bleed valve may be provided for bleeding air from the separator and a dosing point may be provided for adding liquid to the separator. The bleed valve and dosing point may be provided in a single fitting.

The obstruction means may include a plurality of pins. At least one of the pins may extend through an aperture in the dividing member into the first chamber. This slows flow directly above the dividing member.

The pins may extend perpendicularly from the base of the tray and may be cylindrical or substantially conical. At least one of the pins may be cut away on one side to present a flat surface to flow through the inlet. The inlet flow may be tangential for setting up swirl in the first chamber and the flat surfaces preferably face the flow to create drag and slow the flow.

The obstruction means may also include a plurality of radial walls provided on the dividing member which may extend into the first chamber.

An aperture may be provided through the dividing member at the base of at least one of the radial walls, the radial wall guiding flow through the aperture.

Advantageously, the radial walls assist in slowing the flow directly above the dividing member and direct flow into the second chamber, where particles held in suspension are separated.

DESCRIPTION OF THE DRAWINGS

For a better understanding of the present invention, and to show more clearly how it may be carried into effect, reference will now be made, by way of example only, to the accompanying drawings, in which.

DESCRIPTION OF PREFERRED EMBODIMENT

Figure 1:
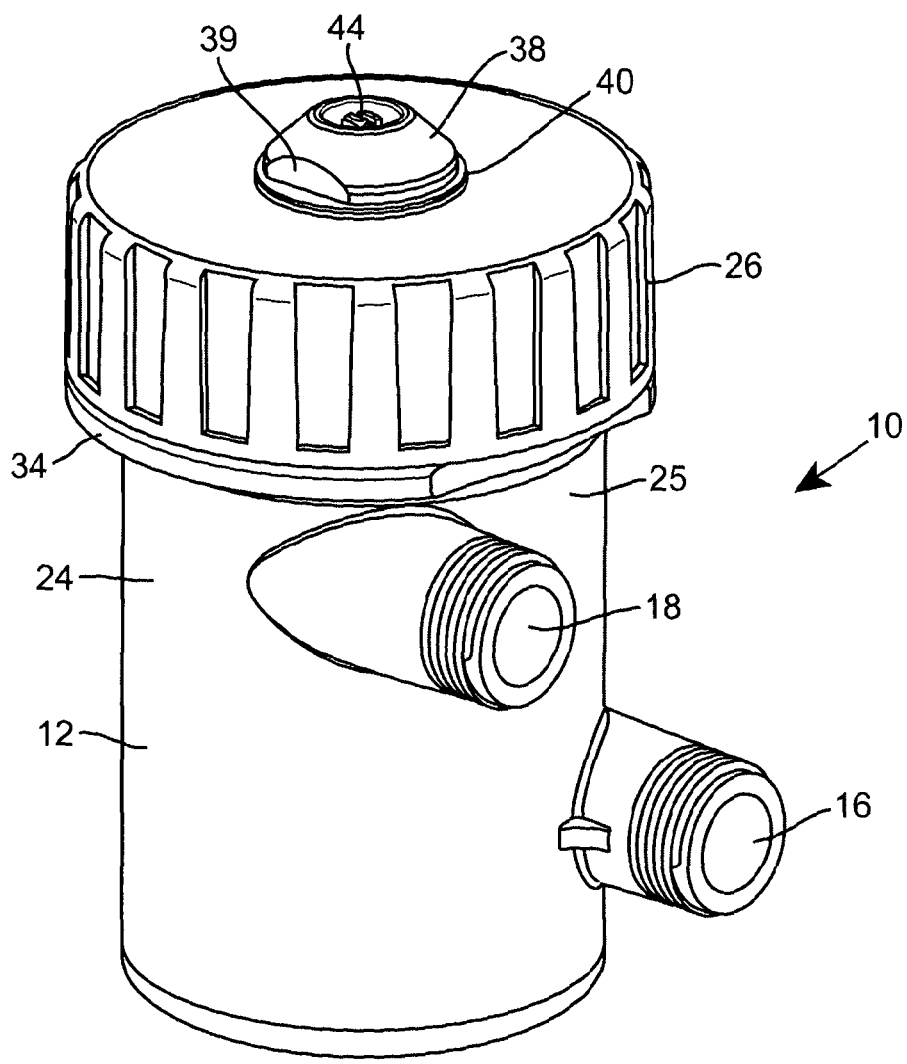
FIG. 1 shows a perspective view of a separator according to the present invention.
Figure 2:
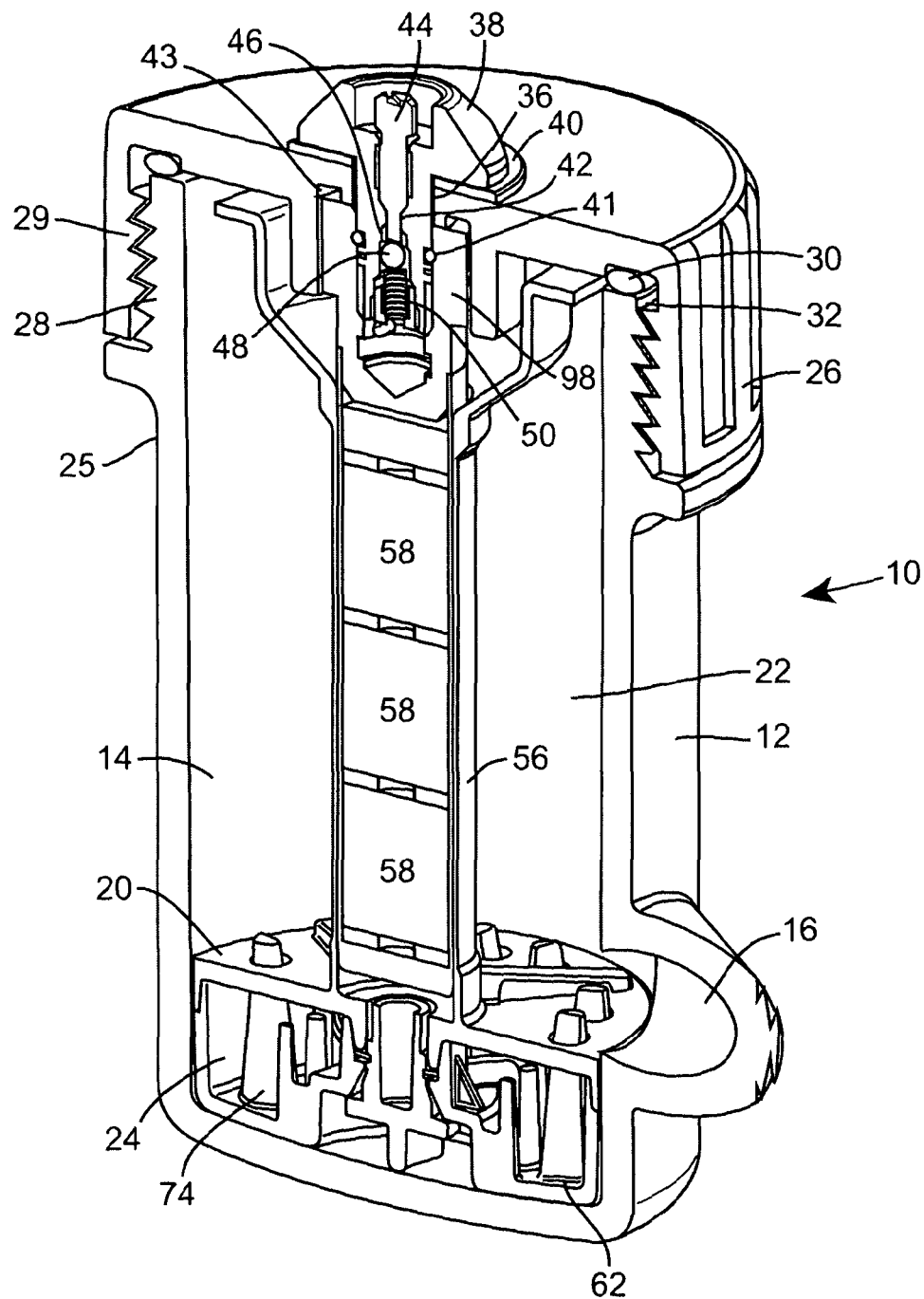
FIG. 2 shows a perspective cut-away view through the separator of FIG. 1.

Referring firstly to FIGS. 1 and 2, a separator for separating, for example, particles in suspension in central heating system water, is indicated generally at 10. The separator 10 comprises a substantially cylindrical housing 12 and a separator chamber 14 contained within the housing 12. An inlet 16 and outlet 18 are provided for circulating flow through the separator chamber 14. The separator chamber 14 is divided into two smaller chambers by means of a dividing member 20. The dividing member 20 is substantially a flat circular plate. A first chamber 22 is provided above the dividing member 20 and a second chamber 24 is provided below the dividing member 20. As will be described in detail below, flow is able to circulate between the chambers 22, 24, although the inlet 16 and outlet 18 both open into the first chamber 22.

The housing 12 includes a body portion 25 and a removable closure portion 26. The upper end of the body portion 25 is formed with a male thread 28 and the closure portion is in the form of a screw-on cap with co-operating internal thread 29. A seal 30 is provided in a circular recess 32 in the underside of the closure portion 26 and when the closure portion 26 is screwed fully onto the end of the body portion 25, the seal is pinched between the end of the body portion and the circular recess 32, thus forming a watertight seal.

Referring in particular to FIG. 2, an aperture 36 is provided through the centre of the end of the closure portion 26, for receiving a fitting 38. The fitting 38 is threaded into the aperture 36 and sits on a stainless steel seat or washer 40. Flats 39 are provided on the side of the fitting 38, enabling it to be gripped by a spanner or the like for tightening, replacement or servicing. An O-ring seal 41 is provided between the fitting 38 and a hermetically sealed magnet unit 98, described further below. A second O-ring seal (not shown for clarity) sits in a circumferential groove between the end of the hermetically sealed magnet and the underside of the closure portion 26. The fitting 38 is a combined air bleed valve and vessel dosing point, as described in granted patent GB 2402894, which is incorporated herein by reference.

The fitting 38 has an axial bore 42 extending there-through which is sealed at its outer end by a screw-in plug 44. A valve seating 46 is provided part way along the axial bore which seats a substantially spherical valve member 48. The valve member 48 is biased into contact with the valve seating by means of a spring 50.

When it is desired to dose the separator with, for example, an inhibitor, then the screw-in plug 44 can be removed and the spherical valve member 48 is biased into contact with the valve seating 46 thereby sealing the axial bore 42 and preventing fluid from leaving the separator 10. A fluid dosing dispenser can then be attached to the threaded axial bore 42 and pressurized, thereby forcing fluid through the axial bore 42 into the separator 10 by lifting the spherical valve member 48 off the valve seating 46. Once sufficient fluid has been pumped into the separator 10, then the spherical valve member 48 returns to its' rest position against the valve seating 46 and seals the axial bore 42. If, on the other hand it is required to bleed air from the separator 10, then the screw-in plug 44 can be screwed into the fitting 38 such that a projection on the end of the plug 44 contacts the spherical valve member 48 and lifts it from the valve seating 46 against the bias of the spring 50. Any air contained in the top of the separator can then flow freely through the axial bore 42 and past the plug 44 to atmosphere. When liquid starts to appear through the axial bore 42, then the screw-in plug 44 can be tightened to prevent further flow of liquid from the separator 10.

Figure 3:
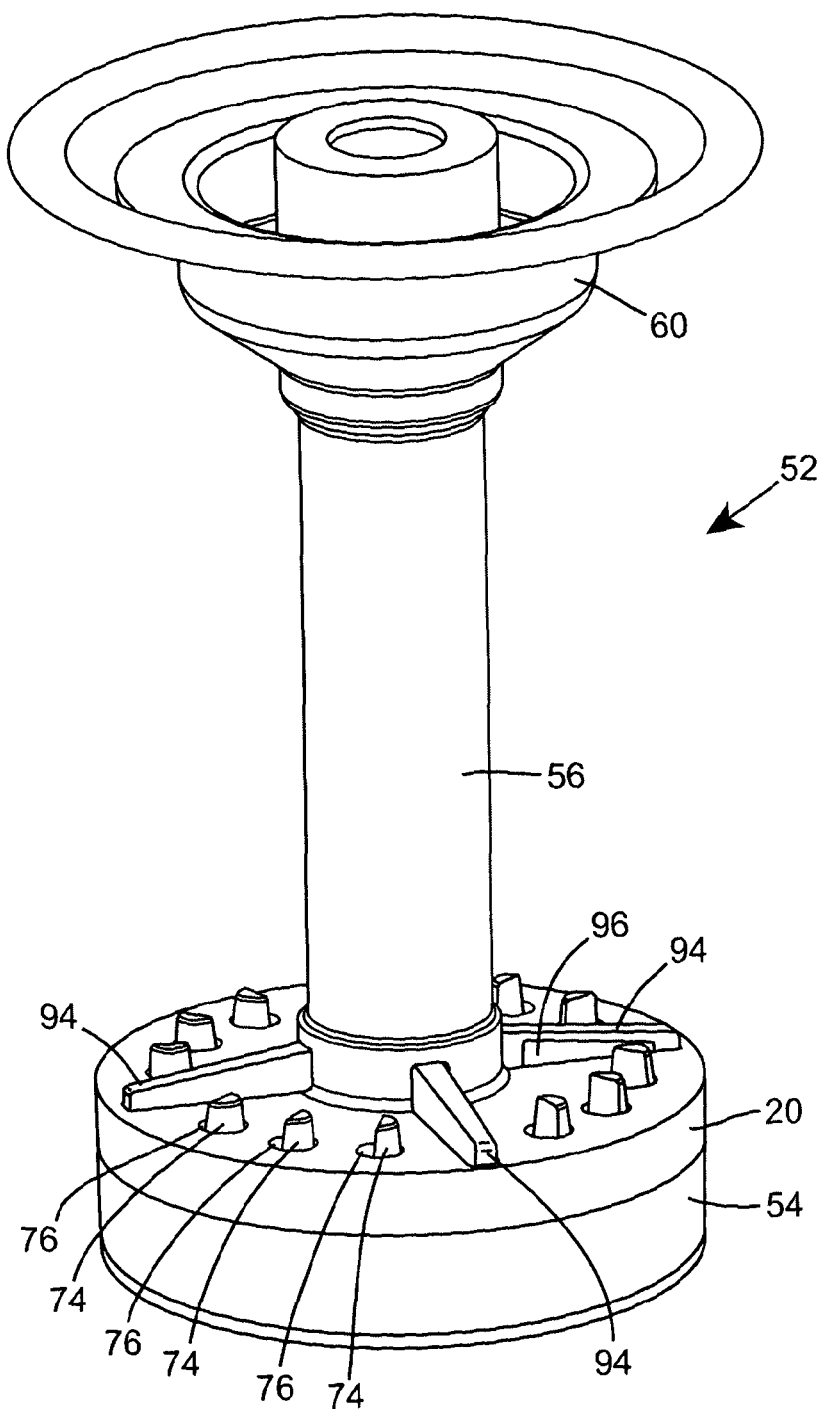
FIG. 3 shows a perspective view of a removable particle collection element of the separator of FIG. 1.

Referring now to FIG. 3, a separation element which fits inside the separator chamber 14 is indicated generally at 52. The separation element 52 includes a substantially circular base member or tray 54 for capturing and containing particles separated from suspension, also seen in FIG. 4. The dividing member 20 sits on top of the tray 54 and is integrally formed with a tubular column or sleeve 56, which contains one or more magnets 58, shown in FIG. 2. A substantially conical deflector 60 is disposed at the upper end of the sleeve 56 for enhancing swirl of the fluid around the sleeve 56.

Figure 4:
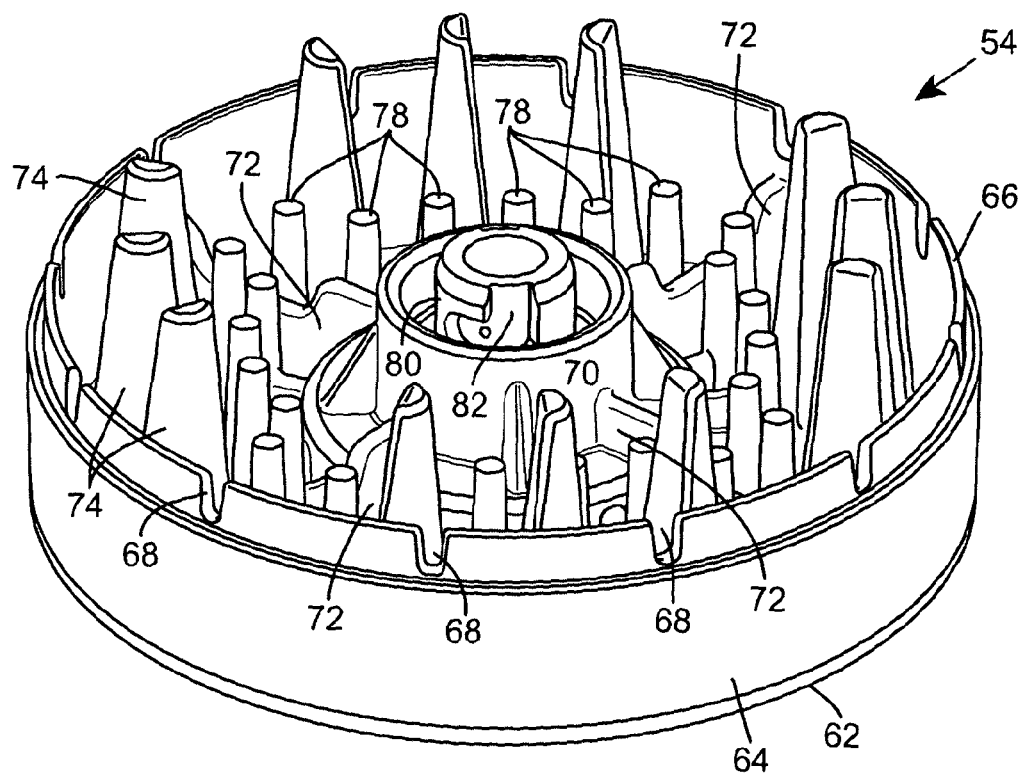
FIG. 4 shows a perspective view of a collection tray of the particle collection element of FIG. 3.

The tray 54 has a circular base 62 and a circular side wall 64 extending there-from. The upper end of the side wall 64 is provided with an axially extending circumferential lip 66. Cut-outs 68, twelve of which can be seen in FIG. 4, are provided in the lip 66 at spaced intervals for location purposes as described further below. A circular or cylindrical boss 70 is provided at the centre of the tray 54 and four radial walls 72 extend from the periphery of the boss to the inside of the side wall 64. The radial walls 72 substantially divide the tray 54 into quadrants. In each quadrant, there are provided a number of obstruction means or arrestor elements, generally taking the form of pins. Three substantially cone shaped arrestor elements 74 are provided in each quadrant, and are cut away to present a substantially flat angled face to anti-clockwise movement around the tray 54, as viewed in FIG. 4. The arrestor elements 74 extend above the height of the lip 66 and when the separation element 52 is assembled, as shown in FIG. 3, the arrestor elements 74 extend through apertures 76 in the dividing member 20. A further six smaller arrestor elements 78 are provided in each quadrant and are positioned inwardly of the arrestor elements 74. All of the arrestor elements 74, 78 extend substantially perpendicularly from the base 62 of the tray 54. The upper edges of the radial walls 72 are partly cut away or recessed to allow flow through the tray 54 underneath the dividing member 20.

Figure 5:
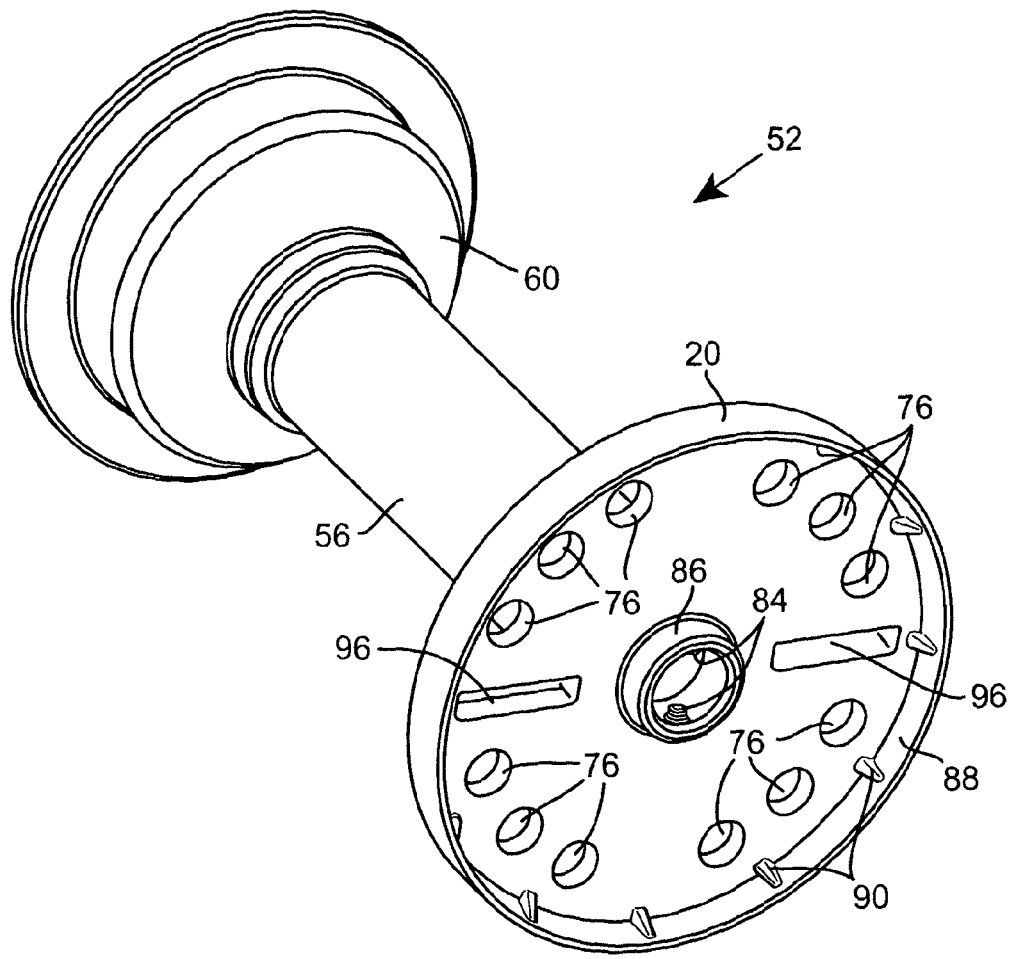
FIG. 5 shows an enlarged view of the separation element of the separator of FIG. 1.
Figure 6:
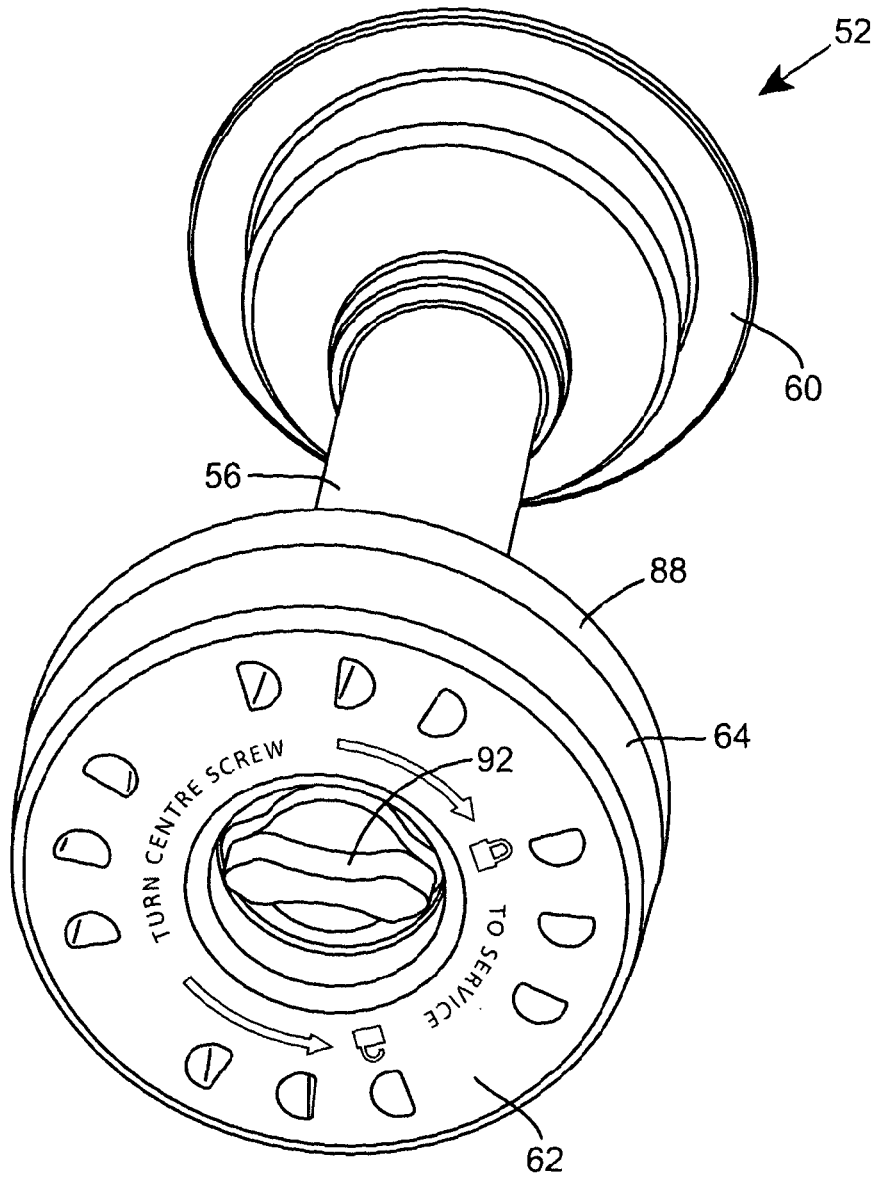
FIG. 6 shows an underside view of the separation element of the separator of FIG. 1, showing the tray locked to the dividing member.

A further pin or boss 80 is provided inside the circular boss 70 at the centre of the tray 54 and is provided with two substantially L-shaped slots 82 on either side thereof. Referring in particular to FIG. 5, a pair of opposed pins 84 are provided on a spigot 86 provided on the underside of the dividing member 20 and the pins 84 and slots 82 together form a bayonet connection for holding the tray 54 and separator element 52 together. A circumferential lip 88 is provided around the underside periphery of the dividing member 20 and has 12 equi-spaced internal flanges or location members 90 for location in the cut outs 68 in the lip 66 of the tray 52. The central boss 80 in the base of the tray 54 is mounted for rotation relative to the tray 54 and is provided with a finger grip 92, as seen in FIG. 6.

Referring back to FIG. 3, four radial flanges 94 are provided at the junction of the sleeve 56 with the dividing member 20 and taper from the sleeve 56 to the outer edge of the dividing member 20. Two of the opposing radial flanges 94 are provided with slots 96 therein which extend right through the dividing member 20 to its underside as shown in FIG. 5. The slots 96 are disposed in faces of the radial flanges 94 which face an anticlockwise direction of movement as indicated in FIG. 3. In other words, the slots 96 face in the same direction as the flats of the arrestor elements 74.

Referring in particular to FIG. 2, a number of cylindrical magnets 58, three of which are shown, are provided within a hermetically sealed unit 98, which is a clearance fit inside the sleeve 56. The separation element 52 and sleeve 56 are made from a plastics material which is non-magnetic.

The operation of the separator 10 will now be described. The separator is suitable for use with all central heating systems and can be fitted anywhere in the main circuit. However in order to achieve the best protection for the boiler it is recommended that the separator be fitted after the last radiator in the circuit before the boiler. The return flow pipe to the boiler should be connected to the inlet 16 and the outlet 18 is then connected back to the return pipe for connection to the boiler. The inlet and outlet 16, 18 are unrestricted, and therefore there should be minimal restriction to the flow by installation of the separator. The inlet 16 is provided substantially tangentially to the wall of the first chamber 22 directly above the dividing member 20. The outlet 18 is also tangentially disposed at the upper end of the first chamber 22 just below the position of the conical deflector 60.

Once installed, the tray 54 is connected to the separation element 52 by means of the bayonet connection 82, 84. The finger grip 92 is rotated to engage the opposed pins 84 in the L-shaped slots 82 to lock the tray 54 to the dividing member 20 and integral sleeve 56. The hermetically sealed magnet pack is disposed within the sleeve 56. Conveniently it can be moved in and out of the tubular sleeve by sliding. The assembled separator element 52 can then be lowered into the separator chamber 14 and the closure portion 26 screwed onto the end of the housing 12. Any air in the separator 10 can be removed using the fitting 38, as previously described.

As the system water flows through the inlet 16, swirl is set up in the first chamber 22 around the magnets 58 and any magnetite is attracted to the external wall of the sleeve 56, where it collects. As the flow passes over the top of the dividing member 20, the flow is slowed by virtue of the tips of the arrestor elements 74 and the radial flanges 94. A portion of the flow is also directed by the radial flanges down through the apertures or slots 96 into the second chamber 24. The flow in the second chamber is slowed further by the arrestor elements 74 and walls 72, to such an extent that particles fall out of suspension and collect in the tray 54. Build up of particles tends to occur close to the arrestor elements and walls, where the flow is slowest.

Flow is able to pass out of the second chamber 24 back into the first chamber through the apertures 76 and also through the apertures 96.

For cleaning, the inlet and outlet 16,18 of the separator can be isolated, the pressure inside the housing released by the bleed valve, and the closure portion 26 removed. The separation element 52 can then be removed. Twisting of the finger grip 92 in the anti-clockwise direction, as indicated in FIG. 6, releases the bayonet fastening and the tray 54 can be removed for cleaning. The magnetic sealed unit 98 can be removed from the tubular sleeve, as required for cleaning.

The separator can be re-commissioned after cleaning, by re-assembly, connection to the system and removal of any air through the bleed valve. The separator is highly effective at removing magnetic and non-magnetic contaminant particles held in suspension, and helps maintain optimum heating system performance.

The invention claimed is:

1. A separator comprising a housing, a separator chamber contained within the housing, a dividing member for substantially dividing the separator chamber into a first chamber and a second chamber, an inlet and outlet to the first chamber, a flow path provided between the first and second chambers for allowing flow to circulate between the first and second chambers, guide means for guiding only a portion of the flow from the inlet through the second chamber, and obstruction means provided in the second chamber for slowing flow through the second chamber, the second chamber being in fluid communication with the inlet and outlet only via the first chamber.

2. A separator as claimed in claim 1, in which the housing includes a body portion and a removable closure portion, the removable closure portion being screw threaded into the body portion.

3. A separator as claimed in claim 1, in which the second chamber includes a tray having a base and at least one sidewall for collecting sediment.

4. A separator as claimed in claim 3, in which the dividing member adjoins and is releasably connected to the tray.

5. A separator as claimed in claim 4, in which the dividing member is connected to the tray by means of a bayonet fixing.

6. A separator as claimed in claim 5, in which a magnet is provided in the first chamber.

7. A separator as claimed in claim 6, in which a tubular sleeve is provided around the magnet.

8. A separator as claimed in claim 7, in which the tubular sleeve is mounted to the dividing member and extends longitudinally along a central axis of the first chamber.

9. A separator as claimed in claim 8, in which a substantially conical deflector is mounted at the upper end of the first chamber for accelerating flow in the upper part of the chamber.

10. A separator as claimed in claim 9, in which the conical deflector is mounted to the tubular sleeve.

11. A separator as claimed in claim 10, in which the tray, separation member, tubular sleeve and substantially conical deflector are removable for cleaning.

12. A separator as claimed in claim 3, in which the obstruction means includes a plurality of pins.

13. A separator as claimed in claim 12, in which at least one of the pins extends through an aperture in the dividing member into the first chamber.

14. A separator as claimed in claim 13, in which the pins extend perpendicularly from the base of the tray and are cylindrical or substantially conical.

15. A separator as claimed in claim 14, in which at least one of the pins is cut away on one side to present a flat surface to flow through the inlet.

16. A separator as claimed in claim 1, in which a bleed valve is provided for bleeding air from the separator.

17. A separator as claimed in claim 1, in which a dosing point is provided for adding liquid to the separator.

18. A separator as claimed in claim 1, in which the obstruction means includes a plurality of radial walls.

19. A separator as claimed in claim 1, in which a plurality of radial walls are provided on the dividing member and extend into the first chamber.

20. A separator as claimed in claim 19, in which an aperture is provided through the dividing member at the base of at least one of the radial walls, the radial wall guiding flow through the aperture.

* * * * *